F. P. MOSER.
Mitre-Clamp.

No. 207,295.   Patented Aug. 20, 1878.

UNITED STATES PATENT OFFICE.

FELIX P. MOSER, OF SALEM, ILLINOIS.

IMPROVEMENT IN MITER-CLAMPS.

Specification forming part of Letters Patent No. 207,295, dated August 20, 1878; application filed March 8, 1878.

*To all whom it may concern:*

Be it known that I, FELIX P. MOSER, of Salem, Marion county, State of Illinois, have invented certain new and useful Improvements in Miter-Clamps; and I hereby declare the same to be fully, clearly, and exactly described as follows, reference being had to the accompanying drawings, in which—

Figure 1:
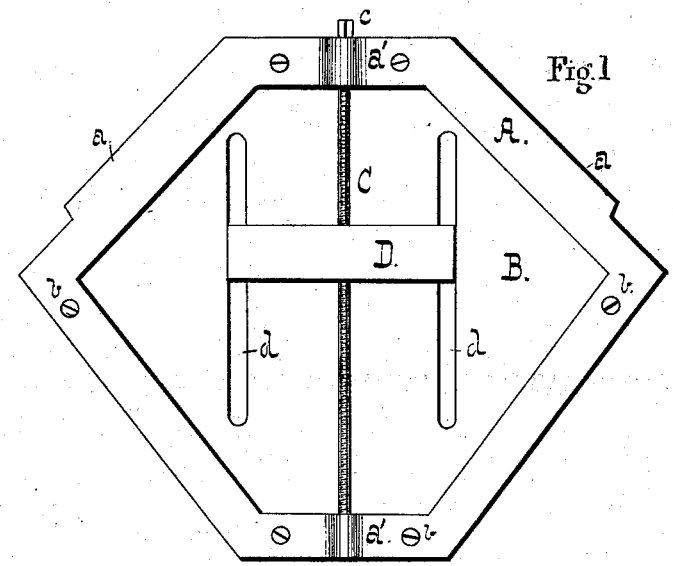
Figure 2:
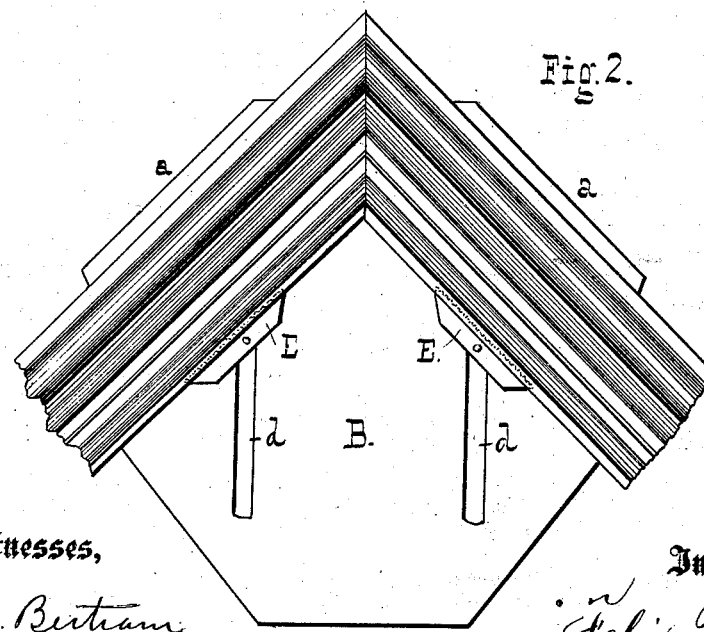

Figure 1 is a rear view, and Fig. 2 a front view, of the device.

While my present invention relates especially to mechanism for securing picture-frame molding while nailing or fastening the miter-joint, it is susceptible of being used for other analogous purposes, as will be evident from the following description of its construction.

In the accompanying drawings, A represents a strong frame, preferably of cast-iron, having flanges $a\,a$ at right angles to the plane of the frame. These flanges are shown in the drawings as at right angles to each other, the clamp illustrated being designed for securing the corners of ordinary rectangular picture-frames; but for securing moldings or other articles at other angles the angle of the flanges would, of course, be made to correspond.

Upon the frame A is secured a plate, B, preferably of wood, slotted, as shown at $d\,d$, in a direction parallel to a line bisecting the angle of the flanges $a\,a$. Upon the under side of the frame A are cast bosses $a'\,a'$, which constitute bearings for the screw-rod C, which terminates in a square shoulder, $c$, for the attachment of a crank.

Upon the rod C is mounted a cross-piece, D, to which are pivoted, on the opposite side of the plate B, a pair of swiveling pieces, E, having serrated or roughened edges, as shown in dotted lines.

Such is, in general terms, a description of the construction of the device. Its mode of operation is as follows: The sections of molding, being sawed off in an ordinary miter-box, are placed against the flanges $a$. Upon rotating the screw-rod C the pieces E are made to bear against the inside of the molding, their line of traction being such as to press the moldings against the flanges $a\,a$, and at the same time draw them strongly together at the joint. Should the latter not be perfect, a saw is run between the ends of the sections of molding, the wooden plate B preventing the saw from coming in contact with the metallic frame A. When the joint is perfect, glue is applied, if desired, and the parts are nailed together in the usual manner, in either case the clamp subserving the end of holding the sections strongly together pending the nailing or setting of the glue, or both. When used for securing picture-frame molding exclusively, the pieces E should be made thin enough to fit under the bead for the glass on the inside of the molding, thereby obviating all danger of marring the molding at a point ordinarily visible.

The device is simple in construction, may be made at but a trifling cost, and is thoroughly satisfactory and efficient in operation.

Having thus described my invention, what I claim as new, and desire to secure by Letters Patent, is—

The miter-clamp herein described, consisting of the base B, having slots $d\,d$ and flanges $a\,a$, and the bar D, having swiveling serrated pieces E and mechanism for producing pressure therefrom upon the molding in a direction parallel to the line bisecting the angle of the flanges, substantially as described.

F. P. MOSER.

Witnesses:
D. B. MAGNESS,
W. J. BENNETT.